(12) United States Patent
Grazioso et al.

(10) Patent No.: US 7,439,509 B1
(45) Date of Patent: Oct. 21, 2008

(54) DUAL CHANNEL SIPM FOR OPTIMAL ENERGY AND FAST TIMING

(75) Inventors: Ronald Grazioso, Knoxville, TN (US); Nan Zhang, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 29 days.

(21) Appl. No.: 11/752,693

(22) Filed: May 23, 2007

(51) Int. Cl.
*G01J 5/20* (2006.01)

(52) U.S. Cl. .................................................. 250/338.4

(58) Field of Classification Search ............... 600/436; 250/338.4, 367, 370.11, 368, 370.14, 369, 250/390, 392, 578, 208.1; 357/30
See application file for complete search history.

(56) References Cited

U.S. PATENT DOCUMENTS

2003/0105397 A1*  6/2003  Tumer et al. ................ 600/436

* cited by examiner

*Primary Examiner*—David P Porta
*Assistant Examiner*—Kiho Kim
(74) *Attorney, Agent, or Firm*—Peter L. Kendall

(57) ABSTRACT

Dual channel silicon photomultipliers (SiPMs) can replace PMTs and APDs for use in PET and other radiation detectors. The devices are compact, have high gain, high QE and low noise. Due to their timing performance, these devices can be used in time-of-flight PET applications. By dividing the device into two separate channels, one for timing resolution and one for energy resolution, both can be optimized simultaneously.

20 Claims, 4 Drawing Sheets

DUAL CHANNEL SIPM FOR OPTIMAL ENERGY AND FAST TIMING

BACKGROUND

1. Field of the Invention

The present invention relates to medical imaging systems; more particularly, the present invention relates to silicon photomultipliers (SiPMs) in medical imaging systems.

2. Description of Related Art

SiPMs are semiconductor photon sensitive devices made up of an array of very small Geiger-mode avalanche photodiode (APD) cells on a silicon substrate. An example 10×10 microcell array is shown in FIG. 1. Each cell is connected to one another to form one larger device with one signal output. The entire device size can be as small as 1×1 mm or much larger.

APD cells vary in dimension from 20 to 100 microns depending on the mask used, and can have a density of up to 1000/sq. mm. Avalanche diodes can also be made from other semiconductors besides silicon, depending on the properties that are desirable. Silicon detects in the visible and near infrared range, with low multiplication noise (excess noise). Germanium (Ge) detects infrared to 1.7 µm wavelength, but has high multiplication noise. InGaAs detects to a maximum wavelength of 1.6 µm, and has less multiplication noise than Ge. InGaAs is generally used for the multiplication region of a heterostructure diode, is compatible with high-speed telecommunications using optical fibers, and can reach speeds of greater than Gbit/s. Gallium nitride operates with UV light. HgCdTe operates in the infrared, to a maximum wavelength of about 14 µm, requires cooling to reduce dark currents, and can achieve a very low level of excess noise.

Silicon avalanche diodes can function with breakdown voltages of 100 to 2000V, typically. APDs exhibit internal current gain effect of about 100-1000 due to impact ionization, or avalanche effect, when a high reverse bias voltage is applied (approximately 100-200 V in silicon). Greater voltage can be applied to silicon APDs, which are more sensitive compared to other semiconductor photodiodes, than to traditional APDs before achieving breakdown allowing for a larger operating gain, preferably over 1000, because silicon APDs provide for alternative doping. Reverse voltage is proportional to gain, and APD gain also varies dependently on both reverse bias and temperature, which is why reverse voltage should be controlled in order to preserve stable gain. Silicon PMTs can achieve a gain of $10^5$ to $10^6$, by operating with a reverse voltage that is greater than the breakdown voltage, and by maintaining the dark count event rate at a sufficiently low level.

Geiger-mode APDs produce a large, fast pulse when struck by a photon of the same amplitude no matter the energy of the photon. When many of these cells are placed together in an array, they can be combined into one large array which will produce an output pulse proportional to the input photon pulse. This device is referred to as a SiPMT. However, as the size of the array increase, so does the capacitance and noise of the device. The supply voltage needed for a SiPM device varies from 30V to 100V depending on the junction type, and is less than the supply voltage needed for a PMT by a factor of from 30 to over 60. The capacitance and noise are proportional to the area of the SiPM device. The risetime of the device is also proportional to its capacitance, and the risetime and noise are the major factors in determining the time resolution in PET. The timing resolution degrades if the risetime becomes longer and the signal becomes noisier. Therefore, the optimal SiPM device would be a very small, fast, low noise device.

However, the smaller the device is, the fewer photons that can be collected to be used for the 511 keV energy discrimination. Thus, typically the size of the device needs to be compromised, resulting in a device that is as large as needed for adequate light collection and energy resolution.

SUMMARY

The embodiments of the present invention overcomes the problems and disadvantages associated with current strategies and designs and provides new materials and methods for improving photodetectors such as avalanche photodiodes.

SiPMs have the potential to become a replacement for photomultiplier tubes (PMTs) and avalanche photodiode (APDs) for use as photodetectors in positron emission topography (PET), Single photon emission computed tomography (SPECT), computed tomography (CT), and other radiation detectors. These devices are compact, have high gain, high quantum efficiency (about 20%-70%, which is better than that of traditional PMTs) and low noise. These devices have the potential to be used in time-of-flight PET applications due to their timing performance. They are also insensitive to magnetic fields, a quality which makes them ideal for use in an MR environment.

One embodiment of this invention is directed to a silicon photomultiplier (SiPM) device comprising a timing channel and an energy channel, wherein the timing channel and the energy channel are electrically isolated from each other. Preferably, the SiPM device comprises an array of Geiger-mode avalanche photodiode (APD) cells and wherein the array produces an output pulse proportional to an input photon pulse.

Another embodiment is directed to an SiPM device, wherein the timing channel contains fewer pixels than the energy channel. Another embodiment is directed to an SiPM device that has a 20×20 cell array, and wherein each cell has a length of 50 µm. Another embodiment is directed to an SiPM device that has a 20×20 cell array, and wherein each cell has a length of 30 µm.

Another embodiment is directed to an SiPM device that has a capacitance of 35 pF. Another embodiment is directed to an SiPM device that has a timing channel that has a 2×2 cell array and wherein the array has an area of 100 µm×100 µm. In one embodiment of the invention, the timing channel of the SiPM device has a capacitance of 0.35 pF.

Another embodiment is directed to an SiPM device, wherein the timing channel and the energy channel each have a separate risetime, and wherein the risetime of the timing channel is 100 times faster than the risetime of the energy channel. In one embodiment, the energy channel has a risetime of 10 ns.

Another embodiment is directed to an SiPM device that has a signal loss of less than 2%. In another embodiment, the SiPM device has a signal loss of less than 1%.

Another embodiment is directed to an SiPM device, wherein for every 511 keV gamma incident on a scintillator, there is a probability of more than 98%, preferably more than 99%, and most preferably of 100%, that one or more photons striking the timing channel.

Another embodiment is directed to an SiPM device, wherein the timing channel is optimized to reduce its dark count rate. In one embodiment, the dark count is $10^8$ counts/ cm²-sec. In another embodiment, the dark count is less than 3000 counts per second, and more preferably of less than 2500 counts per second.

Another embodiment of this invention is directed to an SiPM device, further comprising a 10 ns delay between a timing signal and an energy signal.

Other embodiments and advantages of the invention are set forth in part in the description, which follows, and in part, may be obvious from this description, or may be learned from the practice of the invention.

DETAILED DESCRIPTION OF EXEMPLARY EMBODIMENTS

An SiPM is an array of microcells all connected together to form one single device. The more pixels and the larger the device, the better the light collection which in turn can produce better energy resolution. The fewer the pixels and the smaller the device, the better the timing resolution. In accordance with an embodiment of the invention, in separating the device into separate timing and energy channels, both the energy resolution and the timing resolution could be simultaneously optimized without compromise. In other words, instead of making one device work for both timing and energy, an embodiment of the present invention preferably separates the device into 2 channels: one very small device to produce a very fast and low noise timing signal, and one larger device to collect enough of the scintillation light to provide good energy resolution.

Figure 1:
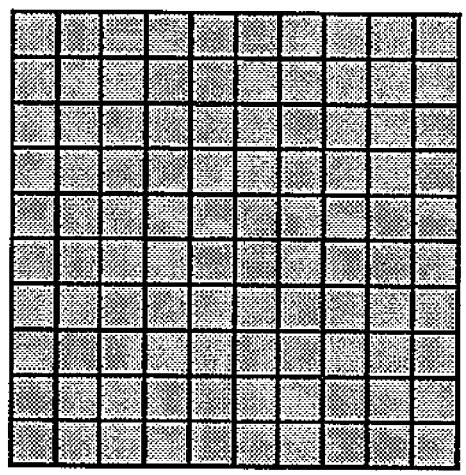
FIG. 1 depicts a representation of a 10×10 array of Geiger-mode microcells which forms a proportional SiPM.
Figure 2:
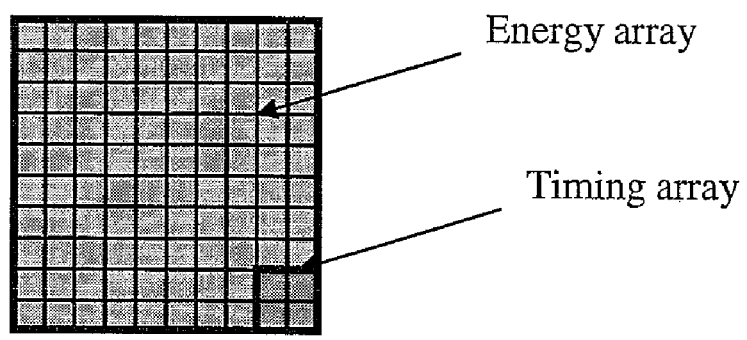
FIG. 2 depicts a representation of a 10×10 array of Geiger-mode microcells which forms a proportional dual channel SiPM in accordance with the invention.

One simple form of the device is shown in FIG. 2. The small 2×2 array in the lower right corner comprises the timing channel and would be electrically isolated from the rest of the cells. The rest of the cells would be connected together to form the energy channel. Also, the timing channel area could be any of the cells within the device, in this representation the area is just shown at the corner but could be placed in the center or any other position.

In many SiPM devices, there are hundreds to thousands of microcells, ranging in size from 30 µm to over 50 µm. An example of a typical SiPM is one from Hamamatsu which has a 20×20 array of 50 µm cells for a total size of 1×1 mm area. The capacitance of this device is 35 pF. Slitting this device into a dual channel device, comprising a timing channel with, preferably, a 2×2 array (100 µm×100 µm), the capacitance of the timing channel may be in the order of 0.35 pF. Since the risetime of the device is directly proportional to its capacitance, the risetime of the timing channel can therefore be preferably 100 times faster than the energy channel which for this particular device is about 10 ns. Since some of the microcells would be used for timing, the energy would degrade. However, since only a few cells are needed to produce a timing signal, the signal loss may be of approximately 5%, more preferably of approximately 3%, more preferably of less than 2%, even more preferably than about 1%, and more preferably of less than 1%. The area used for timing should preferably be optimized for the number of incident photons so that for every 511 keV gamma incident on the scintillator, there would be a greater than 90%, more preferably greater than 95%, more preferably greater than 98%, and more preferably 100% probability of one or more photons striking the timing microcells.

The timing channel area must also be optimized to reduce the number of dark counts which could produce a false timing signal. Typically, these devices have a dark count rate of $10^8$ counts/cm²-sec (STMicro literature). However, the smaller the timing channel area, the lower the dark count rate which will reduce false timing events. For example, if the timing channel area is a 2×2 array of 50 µm cells (100 µm×100 µm total area), then the expected dark count rate would be preferably 2500 counts per second for the timing channel area. This is only 1 count every 400 microseconds. Preferably, the dark count rate would be less than 3000 counts per second for the timing channel area. More preferably, the dark count rate would be less than 2500 counts per second. More preferably, the dark count rate would be less than 2000 counts per second. More preferably, the dark count rate would be less than 1800 counts per second. This count rate is very low compared to the typical count rate in PET. Therefore, the number of false timing events is reduced. Since there still would be random timing events not associated with a true energy event, such events could be discriminated against based on the event timing. For example, when a real scintillation event occurs, an energy and timing signal is produced at the same time. A fixed, known delay could be placed on the timing signal line, preferably at 10 ns, or preferably at anywhere between 5 ns and 20 ns, so the timing signal arrives at the system electronics after the energy signal. When the energy signal is processed, and if it is determined the event is a true 511 keV event, then the data can be processed to find the time signal associated with the real event by going back 10 ns in time in the list mode data. Preferably, the timing events can be gated on the true energy events to eliminate false timing events.

Figure 3:
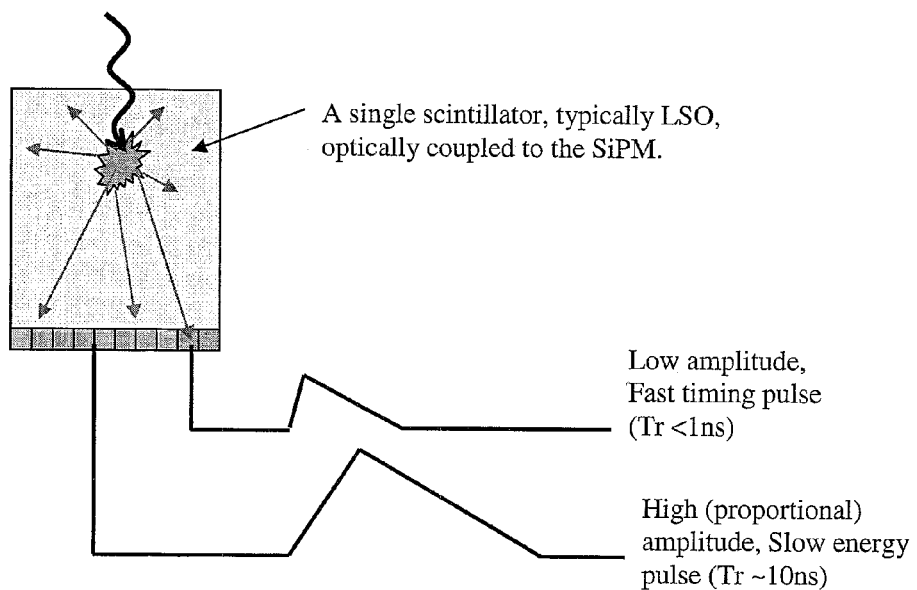
FIG. 3 depicts a side view of a 10×10 array of Geiger-mode microcells which forms the proportional SiPM. A scintillator is placed on top of the SiPM. Light from the scintillator would strike most of the microcells thus triggering a time signal and producing an energy event at the same time. These two pulses would go to separate amplifiers; the timing signal would go to a very fast amplifier and the energy signal could go to a slower shaping amplifier.
Figure 4:
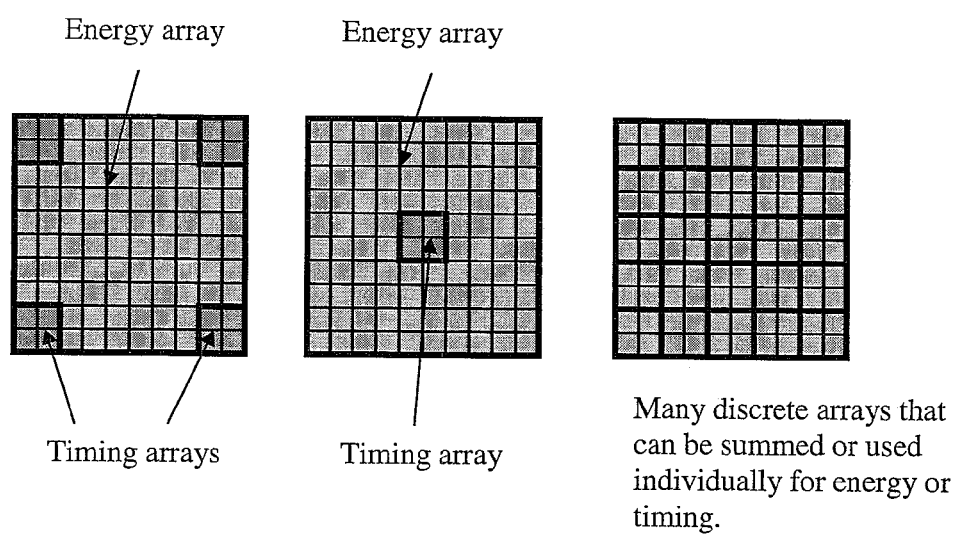
FIG. 4 depicts a number of optional ways of dividing the SiPM into various energy or timing arrays.

FIG. 3 shows a side view of a 10×10 array of Geiger-mode microcells which forms a proportional SiPM. A scintillator is placed on top of the SiPM. Light from the scintillator would strike most of the microcells thus triggering a timing signal and producing an energy event at the same time. These two pulses would go to separate amplifiers; the timing signal would go to a very fast amplifier and the energy signal could go to a slower shaping amplifier.

The following example illustrates embodiments of the invention, but should not be viewed as limiting the scope of the invention.

EXAMPLE

Because APDs are insensitive to magnetic fields, they can be used in PET modules with PET and/or MR imaging. Two, APD-based, PET modules have been evaluated for use in combined PET/MR imaging. Each module comprises 4 independent, optically isolated detectors. Each detector comprises an 8×8 array of 2 mm×2 mm×20 mm LSO crystals read out by a 2×2 array of 5 nm×5 mm Hamamatsu S8664-55 APDs. The average crystal energy resolution and time resolution (against a plastic scintillator on a PMT) of the detectors was 17% and 1.8 ns, respectively. The modules were positioned in the tunnel of a 1.5 Tesla Siemens Symphony MR scanner. The presence of the PET modules decreased the MR signal-to-noise ratio by about 15% but no image interference was observed. The gradient and RF pulse sequences of the MR produced adverse effects on the PET event signals. These high frequency pulses did not affect the true PET events but did increase the dead time of the PET system. Simultaneous, artifact-free, images were acquired with the PET and MR system using a small Derenzo phantom. These results show that APD-based PET detectors can be used for a high-resolution and cost-effective integrated PET/MR system.

Other embodiments and uses of the invention will be apparent to those skilled in the art from consideration of the specification and practice of the invention disclosed herein. For example, All references cited herein, including all publications, U.S. and foreign patents and patent applications, are specifically and entirely incorporated by reference. It is intended that the specification and examples be considered exemplary only with the true scope and spirit of the invention indicated by the following claims.

The invention claimed is:

1. A silicon photomultiplier (SiPM) device comprising a timing channel and an energy channel formed on a single array of detector cells, wherein the timing channel and the energy channel are electrically isolated from each other.

2. The SiPM device of claim 1, wherein said array comprises a plurality of Geiger-mode avalanche photodiode (APD) cells and wherein the array produces an output pulse proportional to an input photon pulse.

3. The SiPM device of claim 1, wherein the timing channel contains fewer pixels than the energy channel.

4. The SiPM device of claim 1, wherein the SiPM device has a 20×20 cell array, and wherein each cell has a length of 50 μm.

5. The SiPM device of claim 1, wherein the SiPM device has a 20×20 cell array, and wherein each cell has a length of 30 μm.

6. The SiPM device of claim 1, wherein the SiPM device has a capacitance of 35 pF.

7. The SiPM device of claim 1, wherein the timing channel has a 2×2 cell array and wherein the array has an area of 100 μm×100 μm.

8. The SiPM device of claim 1, wherein the timing channel has a capacitance of 0.35 pF.

9. The SiPM device of claim 1, wherein the timing channel and the energy channel each have a separate risetime, and wherein the risetime of the timing channel is 100 times faster than the risetime of the energy channel.

10. The SiPM device of claim 1, wherein the energy channel has a risetime of 10 ns.

11. The SiPM device of claim 1, wherein the SiPM device has a signal loss of less than 2%.

12. The SiPM device of claim 1, wherein the SiPM device has a signal loss of less than 1%.

13. The SiPM device of claim 1, wherein for every 511 keV gamma incident on a scintillator, there is a probability of more than 98% that one or more photons striking the timing channel.

14. The SiPM device of claim 1, wherein for every 511 keV gamma incident on a scintillator, there is a probability of more than 99% that one or more photons striking the timing channel.

15. The SiPM device of claim 1, wherein for every 511 keV gamma incident on a scintillator, there is a probability of 100% that one or more photons striking the timing channel.

16. The SiPM device of claim 1, wherein the timing channel is optimized to reduce its dark count rate.

17. The SiPM device of claim 16, wherein the dark count is $10^8$ counts/cm$^2$-sec.

18. The SiPM device of claim 16, wherein the dark count is less than 3000 counts per second.

19. The SiPM device of claim 16, wherein the dark count is less than 2500 counts per second.

20. The SiPM device of claim 1, further comprising a 10 ns delay between a timing signal and an energy signal.

* * * * *